United States Patent
Vas et al.

(10) Patent No.: US 9,900,387 B2
(45) Date of Patent: *Feb. 20, 2018

(54) DISTRIBUTED REBUILDING OF DATA IN A DISPERSED STORAGE NETWORK

(71) Applicant: International Business Machines Corporation, Armonk, NY (US)

(72) Inventors: Sebastien Vas, Sunnyvale, CA (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,026

(22) Filed: Aug. 18, 2017

(65) Prior Publication Data

US 2017/0346901 A1    Nov. 30, 2017

Related U.S. Application Data

(63) Continuation of application No. 14/447,909, filed on Jul. 31, 2014, now Pat. No. 9,774,680, which is a
(Continued)

(51) Int. Cl.
*G06F 12/00* (2006.01)
*H04L 29/08* (2006.01)
(Continued)

(52) U.S. Cl.
CPC .......... *H04L 67/1097* (2013.01); *G06F 3/067* (2013.01); *G06F 3/0614* (2013.01);
(Continued)

(58) Field of Classification Search
None
See application file for complete search history.

(56) References Cited

U.S. PATENT DOCUMENTS

| 4,092,732 | A | 5/1978 | Duchi |
| 5,454,101 | A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Baboucarr Faal
(74) *Attorney, Agent, or Firm* — Garlick & Markison; Timothy W. Markison; Harry S. Tyson, Jr.

(57) ABSTRACT

A technique of rebuilding encoded data slices in a dispersed storage network when detecting a plurality of encoded data slices that require rebuilding, as may occur upon failure of a memory device storing the encoded data slices. A plurality of rebuilding resources capable for use to rebuild the plurality of data slices are determined and, based on one or more attributes associated with the determination, a rebuilding task is apportioned. The resulting rebuilding assignments are allocated to the plurality of rebuilding resources to rebuild the encoded data slices. The allocation of the rebuilding assignments permits more than one rebuilding resource and associated distributed storage units to rebuild the encoded data slices.

20 Claims, 14 Drawing Sheets

| DS unit assignment table 102 ||||
|---|---|---|---|
| configuration 104 || assignments 106 ||
| site ID 108 | DS unit ID 110 | pillar ID 112 | DSN address range 114 |
| 1 | 1 | 0 - A | 1ˢᵗ 16th |
| 1 | 2 | 0 - B | 2ⁿᵈ 16th |
| 1 | 3 | 1 - A | 3ʳᵈ 16th |
| 1 | 4 | 1 - B | 4ᵗʰ 16th |
| 2 | 5 | 2 - A | 5ᵗʰ 16th |
| 2 | 6 | 2 - B | 6ᵗʰ 16th |
| 2 | 7 | 3 - A | 7ᵗʰ 16th |
| 2 | 8 | 3 - B | 8ᵗʰ 16th |
| 3 | 9 | 4 - A | 9ᵗʰ 16th |
| 3 | 10 | 4 - B | 10ᵗʰ 16th |
| 3 | 11 | 5 - A | 11ᵗʰ 16th |
| 3 | 12 | 5 - B | 12ᵗʰ 16th |
| 4 | 13 | 6 - A | 13ᵗʰ 16th |
| 4 | 14 | 6 - B | 14ᵗʰ 16th |
| 4 | 15 | 7 - A | 15ᵗʰ 16th |
| 4 | 16 | 7 - B | 16ᵗʰ 16th |

Related U.S. Application Data continuation of application No. 12/943,826, filed on Nov. 10, 2010, now Pat. No. 8,954,667.

(60) Provisional application No. 61/299,228, filed on Jan. 28, 2010.

(51) Int. Cl.
*G06F 11/10* (2006.01)
*G06F 3/06* (2006.01)

(52) U.S. Cl.
CPC ........ *G06F 3/0647* (2013.01); *G06F 11/1092* (2013.01); *G06F 2211/1028* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,203,871 B2 * | 4/2007 | Turner ................ | G06F 11/1076 711/148 |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Kin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

* cited by examiner computing system 10

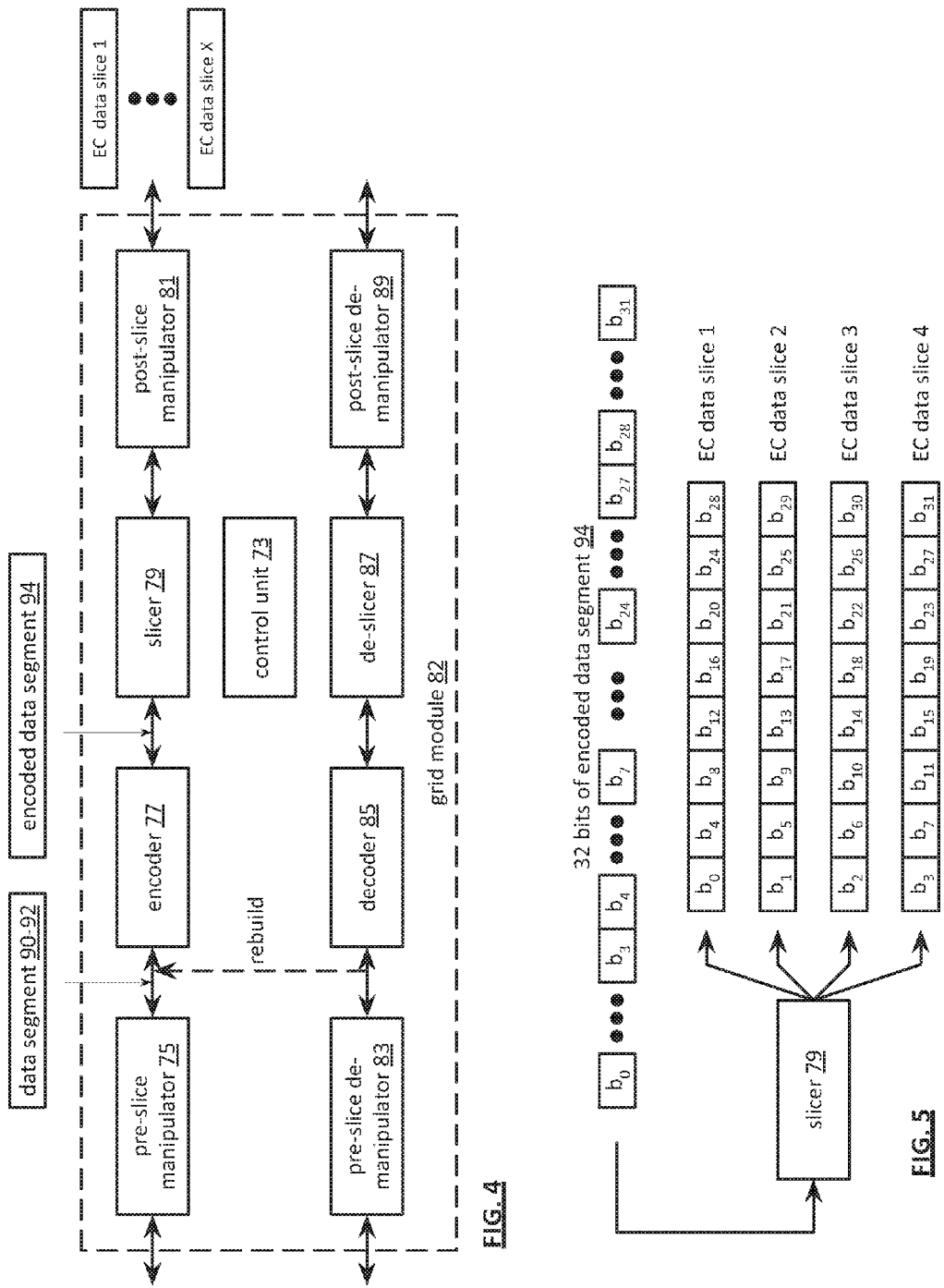

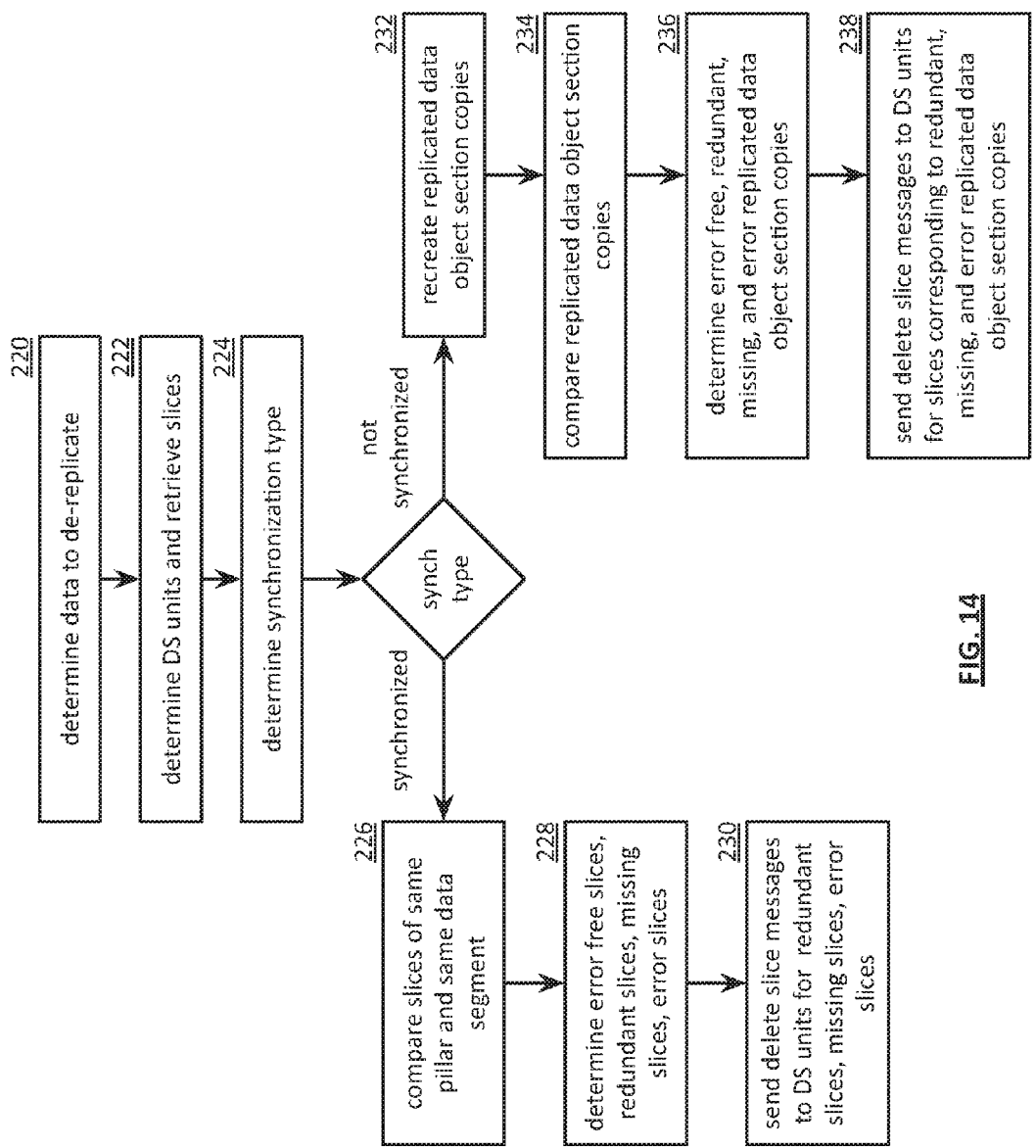

DISTRIBUTED REBUILDING OF DATA IN A DISPERSED STORAGE NETWORK

CROSS REFERENCE TO RELATED APPLICATIONS

The present U.S. Utility Patent Application claims priority pursuant to 35 U.S.C. § 120 as a continuation of U.S. Utility application Ser. No. 14/447,909, entitled "DISTRIBUTED REBUILDING OF DATA IN A DISPERSED STORAGE NETWORK", filed Jul. 31, 2014, which is a continuation of U.S. Utility application Ser. No. 12/943,826, entitled "DATA MIGRATION IN A DISPERSED STORAGE NETWORK," filed Nov. 10, 2010, issued as U.S. Pat. No. 8,954,667 on Feb. 10, 2015, which claims priority pursuant to 35 U.S.C. § 119(e) to U.S. Provisional Application No. 61/299,228, entitled "DISTRIBUTED STORAGE SYSTEM STORAGE METHOD," filed Jan. 28, 2010, all of which are hereby incorporated herein by reference in their entirety and made part of the present U.S. Utility Patent Application for all purposes.

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 14 is another flowchart illustrating another example of storing data in accordance with the invention.

DETAILED DESCRIPTION OF THE INVENTION

Figure 1:
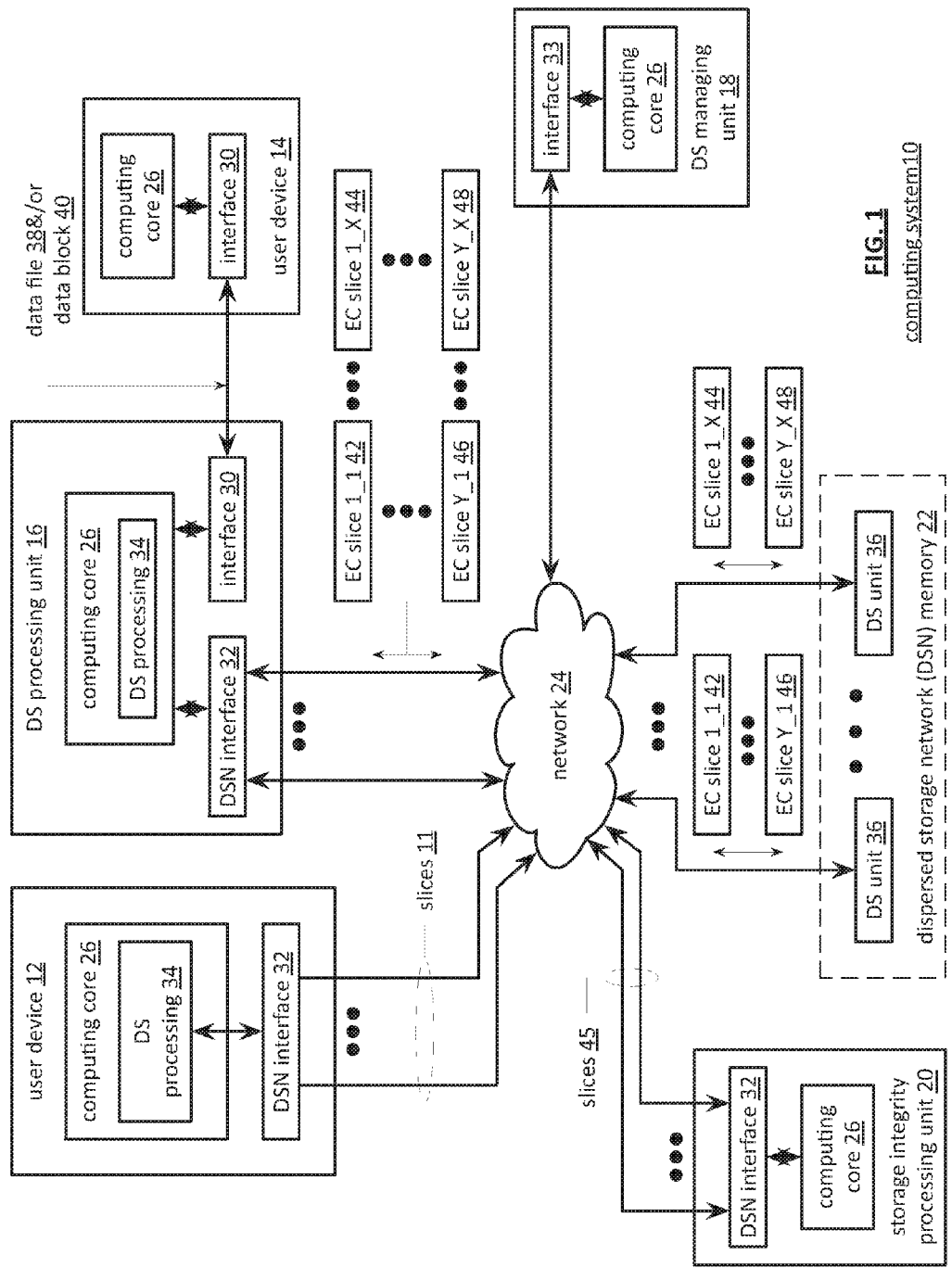
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-14.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-14.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
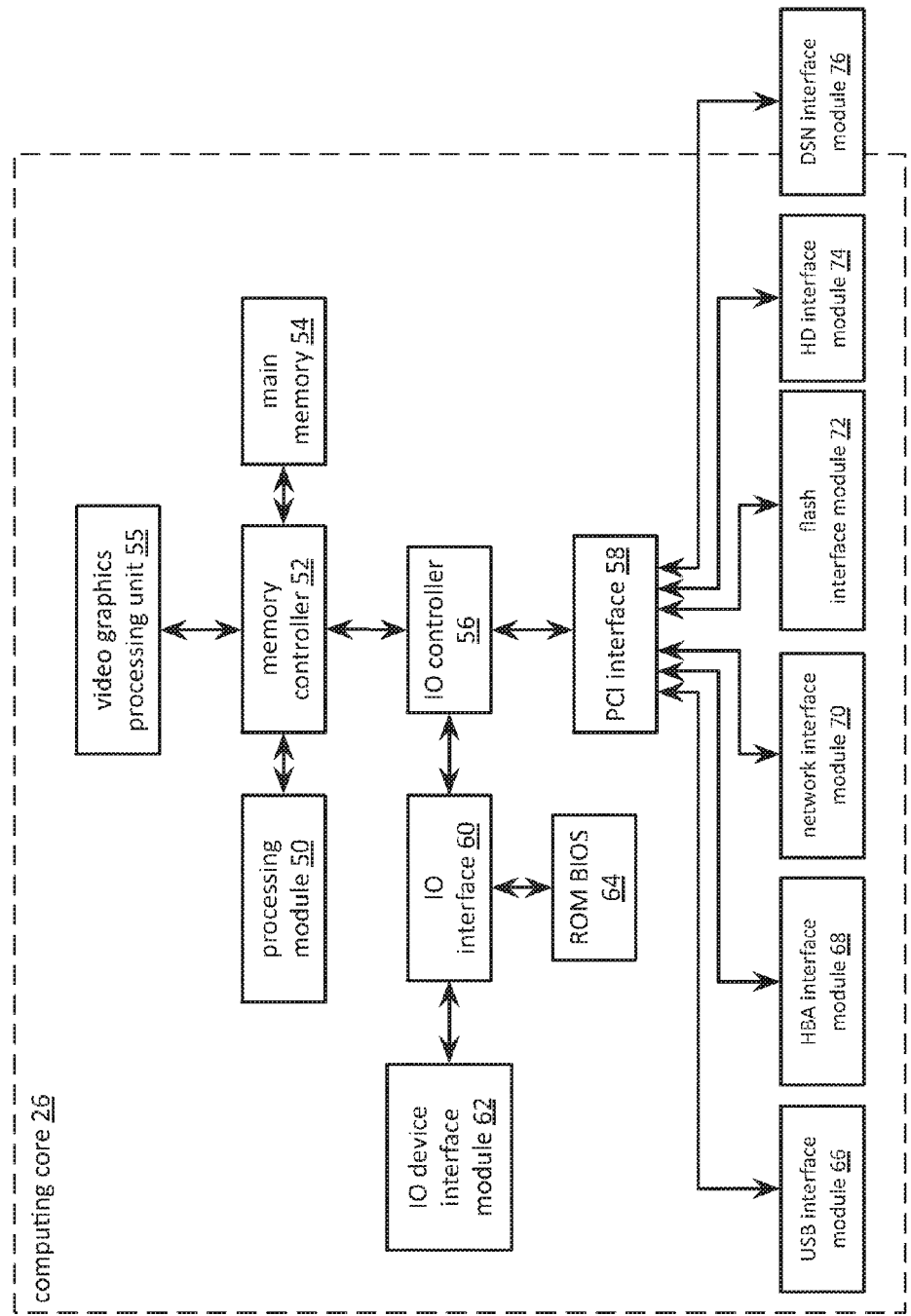
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-14.

Figure 3:
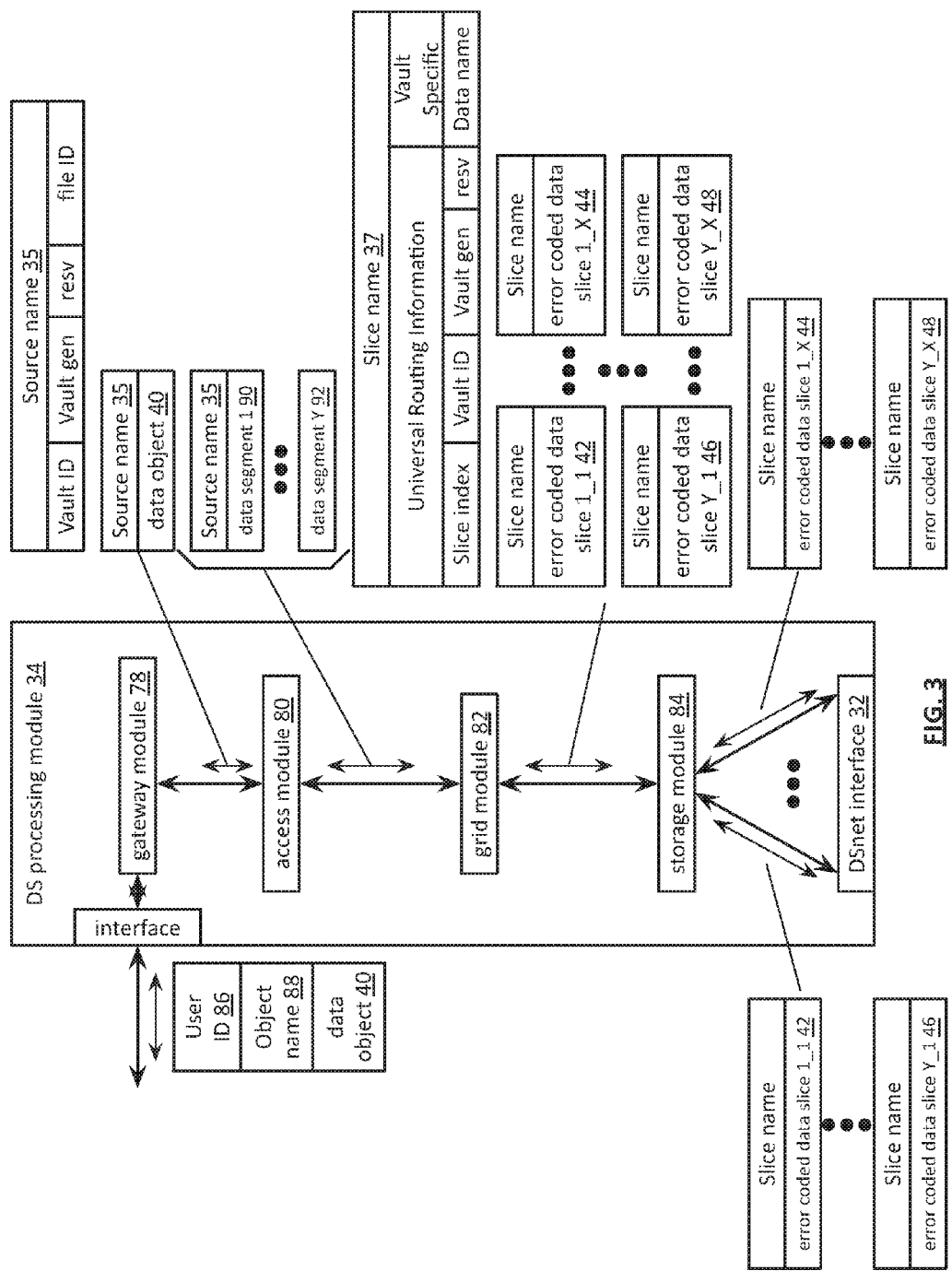
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6A is a schematic block diagram of an example embodiment of a dispersed storage network (DSN) memory 22 where a plurality of dispersed storage (DS) units comprise a DS unit storage set to facilitate the storage of each of the pillars of encoded data slices associated with one or more vaults. As illustrated, DS units 1-16 comprise the DS unit storage set where DS units 1-4 are deployed at site 1, DS units 5-8 are deployed at site 2, DS units 9-12 are deployed at site 3, and DS units 13-16 are deployed at site 4.

In a deployment example, the number of DS units is equal to or greater than the number of pillars such that the DS unit stores slices from at most one pillar. Note that this may provide an improved level of data reliability since an outage of one DS unit may only impact the slice availability for one pillar. For instance, DS units 1-16 comprise the DS unit storage set and may support a vault with a pillar width of 16 and a read threshold of 10 (e.g., a 16/10 system). In another instance, the DS unit storage set may support a vault with a pillar width of 8 and a read threshold of 5 (e.g., an 8/6 system). In another instance, the DS unit storage set may support a vault with a pillar width of 4 and a read threshold of 3 (e.g., a 4/3 system). In another deployment example, the number of pillars may be greater than the number of DS units such that at least one DS unit stores slices of two or more pillars. For instance, the DS unit storage set may support a vault with a pillar width of 32 and a read threshold of 24 (e.g., a 32/24 system) where each DS unit stores slices of two pillars.

The DS units may be affiliated with different sites or locations. The utilization of different sites may provide improved system reliability where data objects can be re-created from slices retrieved from available sites when at least one site is unavailable. Note that slices are retrieved from a read threshold number of pillars to re-create the data object. Further note that the assignment of DS units-to-pillars may impact the ability to retrieve slices of a read threshold number of pillars when DS units and/or sites are unavailable. For example, a data object may not be recoverable due to a site outage in an 8/5 system when each of four DS units at a first site may each be assigned to one pillar and four more DS units at a second site may each be assigned to one pillar. In another example, a data object may still be recoverable with one site outage in an 8/5 system when each of four DS units at four sites may be assigned to half of a pillar (e.g., two pillars per site) since a site outage still leaves six available pillars.

A DS managing unit may determine DS unit pillar assignments to affect system reliability based on one or more of the number of sites, the number of DS units, operational parameters (e.g., pillar width, read threshold), and/or the information dispersal algorithm information (e.g., slice encoding method). For example, a processing module of the DS managing unit determines to assign each of the DS units 1-16 to one pillar when the pillar width is 16 and the read threshold is 10. Note that data objects are recoverable when a maximum of one site is unavailable or when a maximum of six DS units are unavailable and all of the sites are available.

In another example, the processing module determines to assign a pair of DS units per pillar when the pillar width is 8 and the read threshold is 5 (e.g., an 8/5 system). For instance, processing module assigns a first DS unit (e.g., unit A) of the DS unit pair to a first portion of an address range of the slice names that may be stored in the affiliated vault and the processing module assigns a second DS unit (e.g., unit B) of the DS unit pair to a second portion of the address range of the slice names that may be stored in the affiliated vault. Note that data objects are recoverable when a maximum of one site is unavailable or when five DS units are available (e.g., all "A" units or all "B" units) that contain the five pillars of the data object. Further note that in an extreme example this implies that as many as 11 DS units may be unavailable (e.g., all 8 B's and 3 A's) and some of the data (e.g., stored in the A's) may be recoverable. Further note that in another extreme example this implies that as few as four unavailable DS units (e.g., 4 A's) may prevent the recovery of some data objects (e.g., stored to the A's). The method to assign DS units to pillars is discussed in greater detail with reference to FIGS. 6 B and 6 C.

FIG. 6B is a table illustrating an example of a dispersed storage (DS) unit assignment table. Such a table may be utilized by a processing module of a DS managing unit to assign DS units to the pillars of a vault to favorably impact the minimization of unavailable data objects based in part on configuration information. As illustrated, the DS unit assignment table 102 includes a configuration field 104 and an assignments field 106. The configuration field 104 may contain configuration information received from one or more of a user device, a DS processing unit, a storage integrity processing unit, a DS managing unit, and a DS unit. The configuration information may include one or more of a site identifier (ID), a list of site IDs, a DS unit ID, a list of DS unit IDs, a DS unit ID to site ID deployment list, and operational parameters. As illustrated, the configuration field 104 includes a site ID field 108 and a DS unit ID field 110. In an example, the configuration information that includes the deployment of DS units 1-16 to sites 1-4 is received from a DS managing unit input.

As illustrated, the assignments field 106 of the DS unit assignment table 102 includes a pillar ID field 112 and a dispersed storage network (DSN) address range 114. The pillar ID field 112 may indicate a pillar ID to DS unit assignment. The DSN address range field 114 may indicate a DSN address range (e.g., slice name range) to DS unit assignment. In an example, a processing module of a DS managing unit determines the content of the assignments field 106 of the DS unit assignment table 102 based on one or more of configuration information, a DS unit assignment policy, a reliability goal, DS unit availability history, estimated DS unit storage set utilization, site location information, site availability history, environmental factors, a predetermination, a command, and a message.

As illustrated, the processing module assigns pillar 0-A to DS unit 1, pillar 0-B to DS unit 2, pillar 1-A to DS unit 3, pillar 1-B to DS unit 4 for site 1, 2-A to DS unit 5, pillar 2-B to DS unit 6, pillar 3-A to DS unit 7, pillar 3-B to DS unit 8 for site 2, 4-A to DS unit 9, pillar 4-B to DS unit 10, pillar 5-A to DS unit 11, pillar 5-B to DS unit 12 for site 3, 6-A to DS unit 13, pillar 6-B to DS unit 14, pillar 7-A to DS unit 15, pillar 7-B to DS unit 16 for site 4 when the configuration information includes four sites, sixteen DS units, and operational parameters with a pillar width of 8 and a read threshold of 5.

As illustrated, the processing module assigns 1/16 of the configured DS unit address range to each of the sixteen DS units. In an embodiment, a DS processing unit may access the DS unit storage set in the lower part of a pillar address range by accessing the DS units assigned to the A ranges and the DS processing unit may access the DS unit storage set in the upper part of a pillar address range by accessing the DS units assigned to the B Ranges.

FIG. 6C is a flowchart illustrating an example of determining dispersed storage (DS) unit assignment information. The method begins with step 116 where a processing module (e.g., of a DS managing unit) receives DS unit configuration information. The configuration information may be received from one or more of a user device, a DS processing unit, a storage integrity processing unit, a DS managing unit, and a DS unit. The configuration information may include one or more of a vault identifier (ID), a number of DS units assigned to the vault ID, site locations of the DS units, a site ID, a list of site IDs, a DS unit ID, a list of DS unit IDs, a DS unit ID to site ID deployment list, and operational parameters.

The method continues at step 118 where the processing module determines vault configuration information. The vault configuration information may include one or more of the DS unit configuration information, a DS unit assignment policy, a pillar width, a read threshold, a write threshold, a generation number, a dispersed storage network (DSN) address range, encoding method, an encryption method, and any other operational parameters elements. Such a determination may be based on one or more of a vault ID, a DS managing unit message, a vault lookup, a DSN memory performance indicator, a command, a predetermination, and the DS unit configuration information.

Figure 6:
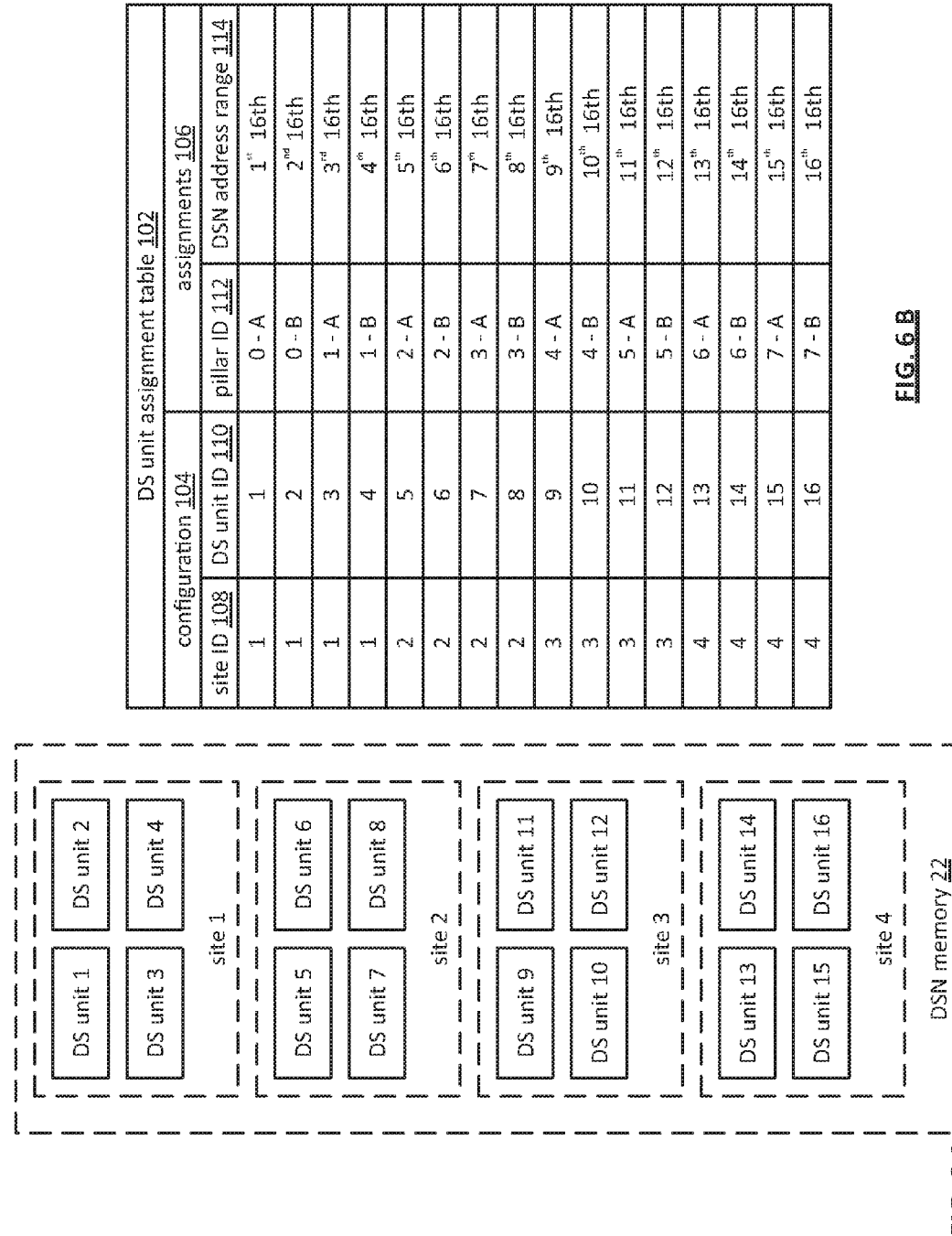
FIG. 6A is a schematic block diagram of an example embodiment of a dispersed storage network (DSN) memory in accordance with the invention.
FIG. 6B is a table illustrating an example of a dispersed storage (DS) unit assignment table in accordance with the invention.
FIG. 6C is a flowchart illustrating an example of determining dispersed storage (DS) unit assignment information in accordance with the invention.
Figure 6:
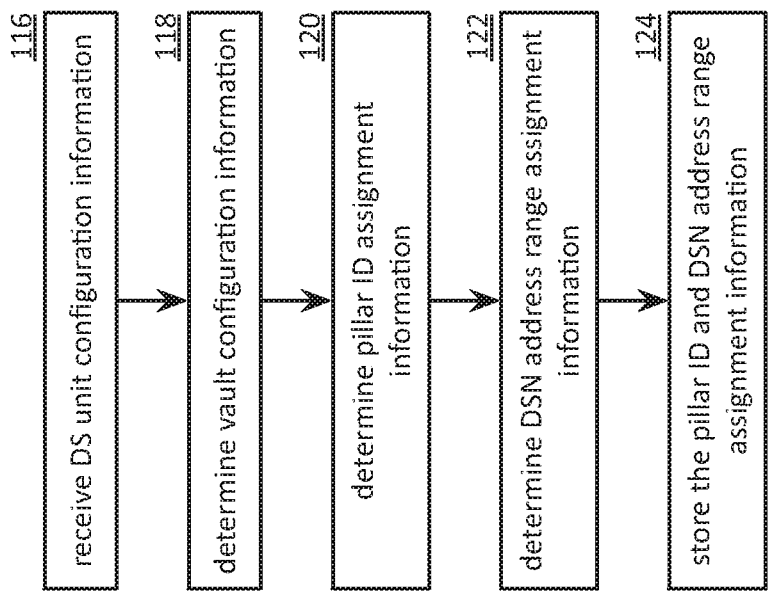

The method continues at step 120 where the processing module determines pillar ID assignment information. Such a determination may be based on one or more of the DS unit configuration information, vault configuration information, a vault ID, a vault lookup, a DS unit assignment policy, a reliability goal, DS unit availability history, a DSN memory performance indicator, estimated DS unit storage set utilization, site location information, site availability history, environmental factors, a predetermination, a command, and message. For example, the processing module determines the pillar ID assignment information as illustrated in FIG. 6 B when there are four sites, 16 DS units, and the pillar width is 8. Note that data objects may still be reproduced based on retrieving slices from DS units when one at most one site of DS units is unavailable.

The method continues at step 122 where the processing module determines DSN address range assignment information. The DSN address range assignment information may include a mapping of DS units to portions of the DSN address range assigned to the vault in accordance with a DS unit assignment policy. Such a determination may be based on one or more of the pillar ID assignment information, the DS unit configuration information, the vault configuration information, a DSN address range vault assignment, the vault ID a DS managing unit message, a vault lookup, a DSN memory performance indicator, a command, and a predetermination. For example, the processing module determines the DSN address range assignment information as illustrated in FIG. 6 B in accordance with the pillar ID assignment information where each pillar is assigned to 1/16 of the DSN address range vault assignment.

The method continues at step 124 where the processing module stores the pillar ID assignment information and the DSN address range assignment information in a DSN memory, and a vault, and in the DSN address to physical location table to facilitate subsequent access of the newly assigned DS unit storage set. In an instance, the information is stored as encoded data slices. In another instance, the information is stored as a data object.

Figure 7:
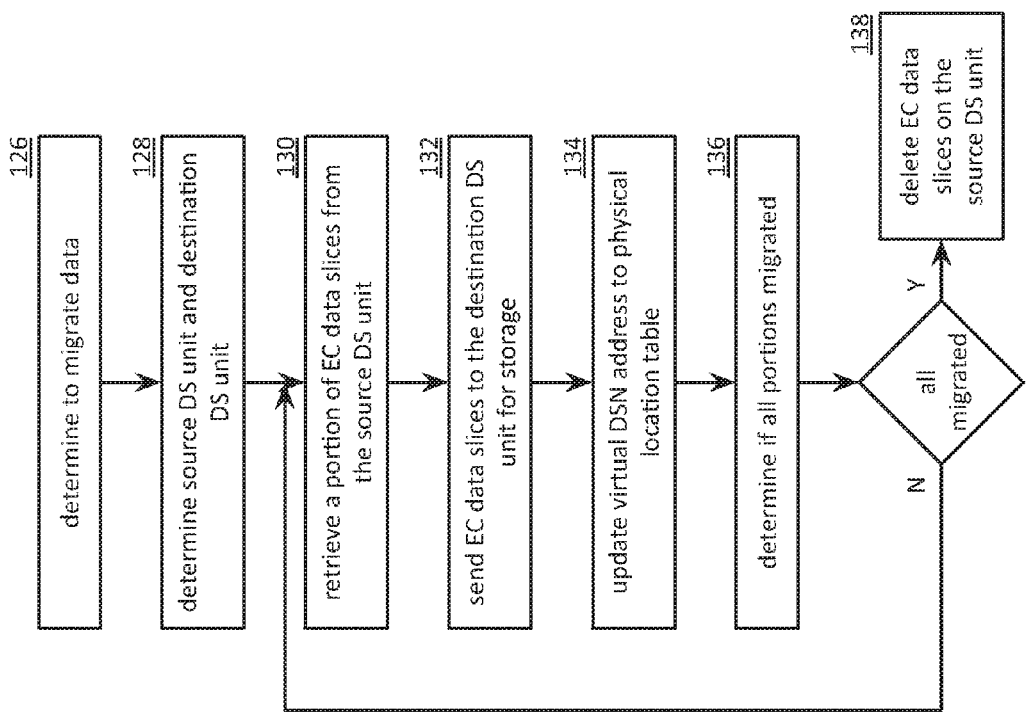
FIG. 7 is a flowchart illustrating an example of migrating data in accordance with the invention.

FIG. 7 is a flowchart illustrating an example of migrating data. Note that the data may include one or more of a data object, a plurality of sets encoded data slices wherein each encoded data slice of a set of encoded data slices corresponds to a pillar wherein a pillar with number of encoded data slices comprise each set, and a plurality of encoded data slices corresponding to one pillar of the plurality of sets of encoded data slices. In an example, all the slices of every pillar are migrated. In another example, slices of one pillar are migrated. Note that the migration may include moving slices from a first memory to at least a second memory. For instance, slices are migrated from the first memory to the second memory. In another instance, slices are migrated from the first memory to the second memory and a third memory.

In an example of operation where slices of all of the pillars are migrated, the method begins with step 126 where a processing module determines data to migrate, wherein the data is stored as a plurality of sets of encoded data slices in a first set of dispersed storage (DS) units. Note that another example of operation is discussed below where slices of one pillar are migrated. Such a determination of the data to migrate is based on one or more of an amount of data to move indicator, a data transferred indicator (e.g., how much of the amount of data to move has been moved so far), a data transfer continuation indicator (e.g., where the migration process left off last time), a DS managing unit message, a DS unit query, a DS unit message, a newly allocated DS unit detection, a location (e.g., away from an area hit by a storm), a schedule, a list, a predetermination, an error message, and a command.

The method continues with step 128 where the processing module determines a source DS unit and a destination DS unit where the source DS unit contains the data to be migrated and the destination DS unit contains the memory where the data will be stored as a result of the migration. Such a determination may be based on one or more of a DS managing unit message, a DS unit query, a DS unit message, a new DS unit detection, a schedule, a predetermination, an error message, and a command. For example, the processing module determines the source DS unit based on information in a migrate data message and the processing module determines the destination DS unit based on a DS unit query to determine newly added DS units.

The method continues with step 130 where the processing module retrieves at least a read threshold number of encoded data slices for each set of the plurality of sets of encoded data slices. The processing module dispersed storage error decodes the at least the read threshold number of encoded data slices for each set of the plurality of sets of encoded data slices in accordance with error coding dispersal storage function parameters to reproduce the data. Note that the error coding dispersal storage function parameters comprises at least one of a pillars list, a segmenting protocol, a pre-slice data manipulation function, a forward error correction encoding function, a slicing pillar width, a post-slice data manipulation function, a write threshold, a read threshold.

The method continues with step 132 where the processing module dispersed storage error encodes the data in accordance with second error coding dispersal storage function parameters to produce a plurality of sets of second encoded data slices. Note that the second error coding dispersal storage function parameters comprises at least one of a pillars list, a segmenting protocol, a pre-slice data manipulation function, a forward error correction encoding function, a slicing pillar width, a post-slice data manipulation function, a write threshold, a read threshold. The processing module sends at least a write threshold number of second encoded data slices to a second set of DS units for storage therein for each set of the plurality of sets of second encoded data slices. Note that the second set of DS units may be the same or different as the first set of DS units.

The method continues with step 134 where the processing module creates an entry in a virtual dispersed storage network (DSN) address to physical location table to indicate an association between the plurality of sets of second encoded data slices and the second set of DS units. The processing module maintains an entry in the virtual dispersed storage network (DSN) address to physical location table to indicate an association between the plurality of sets of encoded data slices and the set of DS units when the read threshold number of encoded data slices remain in the set of DS units (e.g., including the source DS unit). Alternatively, the processing module deletes the entry in the virtual dispersed storage network (DSN) address to physical location table to indicate an association between the plurality of sets of encoded data slices and the set of DS units when the read threshold number of encoded data slices are to be deleted from the set of DS units.

The method continues at step 136 where the processing module determines if all portions of the plurality of sets of encoded data slices have been migrated based on which portions of the plurality of sets of encoded data slices have been migrated so far and which portions have not been migrated. The method branches back to step 130 when the processing module determines that all portions have not been migrated. The method continues to step 138 when the processing module determines that all portions have been migrated.

The method continues at step 138 where the processing module deletes the plurality of sets of encoded data slices by sending a delete encoded data slice message to each DS unit of the first set of DS units, wherein the delete encoded data slice message includes a request to delete the encoded data slices for each set of the plurality of sets of encoded data slices. Alternatively, the processing module sends the delete encoded data slice message to each DS unit of the first set of DS units when receiving a store data slice confirmation message indicating that the plurality of sets of second encoded data slices are stored in the second set of DS units. Alternatively, the processing module sends the delete encoded data slice message to each DS unit of the first set of DS units when a wait time period has elapsed after sending the at least some of the plurality of sets of second encoded data slices to a second set of DS units. Alternatively, the processing module sends the delete encoded data slice message to each DS unit of the first set of DS units when a storage space required indicator is active.

In another example of operation where slices of one of the pillars are migrated, the method begins with step 126 where a processing module determines a pillar of encoded data slices to migrate, wherein the pillar of encoded data slices is stored in a first dispersed storage (DS) unit. Such a determination may be based on one or more of an amount of encoded data slices to move indicator, a data transferred indicator, a data transfer continuation indicator, a DS managing unit message, a DS unit query, a DS unit message, a newly allocated DS unit detection, a location, a schedule, a list, a predetermination, an error message and a command.

The method continues at step 128 where the processing module identifies a second DS unit. Such a determination is based on at least one of a DS managing unit message, a DS unit query, a DS unit message, a newly allocated DS unit detection, a location, a DS unit utilization indicator, a DS unit capacity indicator, a schedule, a predetermination, an error message, and a command. The method continues at step 130 where the processing module retrieves at least some of the encoded data slices of the pillar of encoded data slices from the first DS unit. The method continues at step 132 where the processing module sends the at least some of the encoded data slices of the pillar of encoded data slices to the second DS unit for storage therein.

The method continues at step 134 where the processing module updates an entry in a virtual dispersed storage network (DSN) address to physical location table to indicate an association between the pillar of encoded data slices and the second DS unit. Alternatively, or in addition to, the processing module may maintain an entry in the virtual dispersed storage network (DSN) address to physical location table to indicate an association between the pillar of encoded data slices and the first DS unit (e.g., when the pillar of encoded data slices are to remain in the first DS unit). Alternatively, or in addition to, the processing module may delete the entry in the virtual dispersed storage network (DSN) address to physical location table to indicate the association between the pillar of encoded data slices and the first DS unit (e.g., when the pillar of encoded data slices are to be deleted from the first DS unit).

The method continues at step 136 where the processing module determines if all portions of the pillar of encoded data slices have been migrated based on which portions of the pillar of encoded data slices have been migrated so far and which portions have not been migrated. The method branches back to step 130 when the processing module determines that all portions have not been migrated. The method continues to step 138 when the processing module determines that all portions have been migrated.

The method continues at step 138 where the processing module sends a delete encoded data slice message to the first DS unit, wherein the delete encoded data slice message includes a request to delete the pillar of encoded data slices. Alternatively, the processing module sends the delete encoded data slice message to the first DS unit when receiving a store data slice confirmation message indicating that the pillar of encoded data slices are stored in the second DS unit set. Alternatively, the processing module sends the delete encoded data slice message to the first DS unit when a wait time period has elapsed after sending the at least some of the pillar of encoded data slices to the second DS unit. Alternatively, the processing module sends the delete encoded data slice message to the first DS unit when a storage space required indicator is active.

Figure 8:
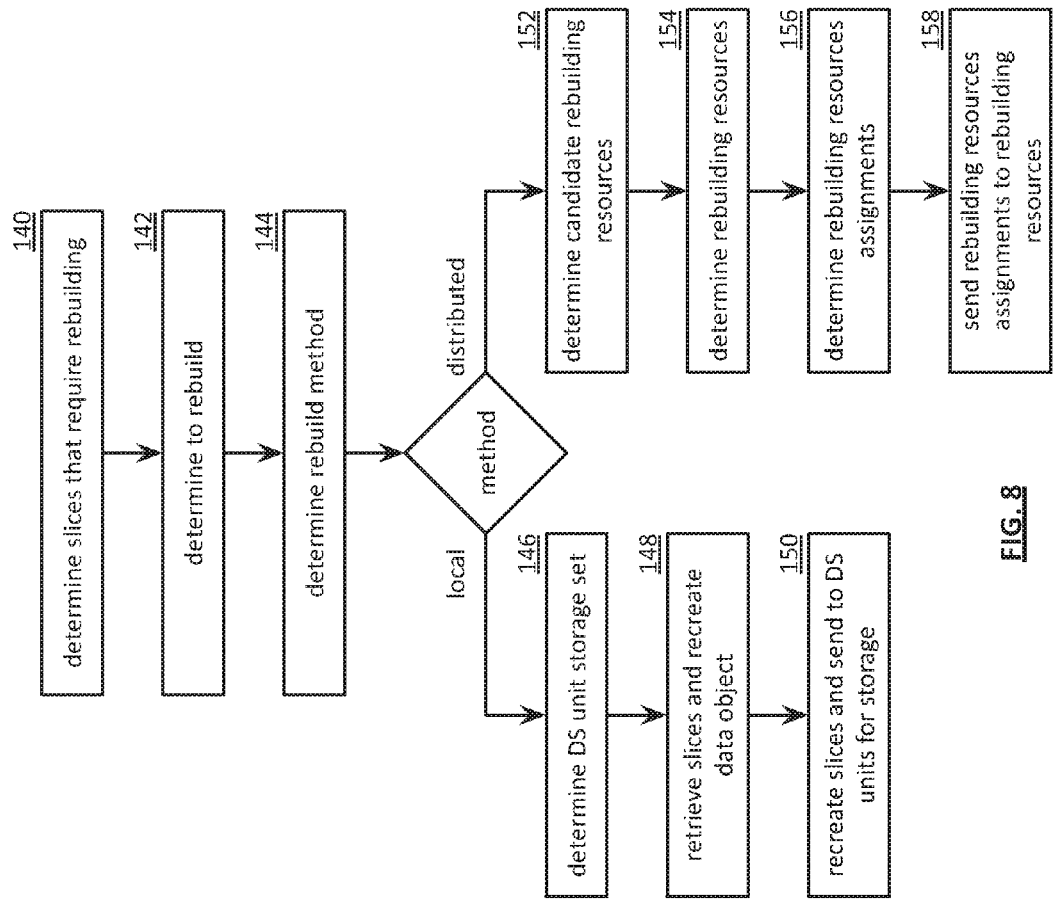
FIG. 8 is a flowchart illustrating an example of rebuilding data in accordance with the invention.

FIG. 8 is a flowchart illustrating an example of rebuilding data. The method begins with step 140 where a processing module determines slice names that require rebuilding. Such a determination may be based on one or more of a command, a message, a local DS unit query, and a DS unit storage set query. For example, the processing module determines the slice names that require rebuilding based on a message received from a storage integrity processing unit. In another example, the processing module determines the slice names that require rebuilding based on comparing calculated slice checksums to stored slice checksums in a local DS unit query. For instance, the processing module determines the slice names when the calculated slice checksums do not match the stored slice checksums. In another example, the processing module determines the slice names based on a message from a DS managing unit when a DS unit fails. In another example, the processing module determines the slice names that require rebuilding based on a query of a DS unit storage set when at least one DS unit of the DS unit storage set reports that there is at least one slice error.

The method continues at step 142 where the processing module determines to rebuild. Such a determination may be based on one or more of slices that require rebuilding, a rebuilding error threshold, an error list, a number of errors, a comparison of the number of errors to the rebuilding error threshold, a command, a message, a local DS unit query, and a DS unit storage set query. For example, the processing module determines not to rebuild when the number of errors is below a rebuilding error threshold. In another example, the processing module determines to rebuild when the number of errors is above the rebuilding error threshold and/or a DS managing unit message indicates rebuilding.

The method continues at step 144 where the processing module determines a rebuild method wherein the method includes one of a local method (e.g., rebuilding is executed by a DS unit) and a distributed method (e.g., rebuilding is executed by two or more units and/or modules of the computing system). Such a determination may be based on one or more of a number of slices that require rebuilding, an estimate of the load to rebuild the slices, a DS unit loading indicator, a DS unit capacity indicator, a rebuilding loading threshold, a rebuilding error threshold, an error list, a number of errors, a comparison of the number of errors to the rebuilding error threshold, a command, a message, a local DS unit query, and a DS unit storage set query. For example, the processing module determines to utilize the local rebuilding method when an estimated load to rebuild slices is below a rebuilding loading threshold. In another example, the processing module determines to utilize a distributed rebuilding method when the estimated load to rebuild the slices is above the rebuilding loading threshold and/or the DS unit storage set query indicates DS units that have capacity to help execute the rebuilding of slices. The method branches to step 152 when the processing module determines the rebuild method is the distributed method. The method continues to step 146 when the processing module determines the rebuild method is the local method. Note that a local DS unit may be assigned as part of the distributed rebuild approach.

The method continues at step 146 where the processing module determines a DS unit storage set and operational parameters where the DS unit storage set includes the DS units of the affiliated pillars of the error slices. Such a determination may be based on one or more of the slice names to rebuild, a command, a message, a vault lookup, and a virtual dispersed storage network (DSN) address to physical location table lookup. The method continues at step 148 where the processing module retrieves slices from the DS unit storage set and re-creates the data object in accordance with the operational parameters (e.g., dispersed storage error decodes the slices to produce the data object). The method continues at step 150 for the processing module dispersed storage error encodes the data object to produce slices and sends slices corresponding to the slices requiring rebuilding to the corresponding DS units of the DS unit storage set for storage therein.

The method continues at step 152 where the processing module determines candidate rebuilding resources when the processing module determines the rebuild method is the distributed method. Such a determination may be based on one or more of DS unit availability, a DS unit capacity indicator, a DS unit loading indicator, a DS unit proximity to the DS unit storage set indicator, a DS unit storage set, system module availability indicator, a query, a list, a predetermination, a message, and a command. For example, the processing module determines the candidate rebuilding resources to include each DS unit of the associated DS unit storage set when a query of the DS unit storage set indicates that each of the DS units is available to assist in the rebuilding.

The method continues at step 154 where the processing module determines rebuilding resources where the rebuilding resources are the resources to execute the distributed rebuilding. Such a determination may be based on one or more of a performance goal, a security goal, the candidate rebuilding resources, estimated DS unit performance, DS unit availability, a DS unit capacity indicator, a DS unit loading indicator, a loading threshold, a DS unit proximity to the DS unit storage set indicator, the DS unit storage set, a system unit and/or system module availability indicator, a query, a list, a predetermination, a message, and a command. For example, the processing module determines the rebuilding resources to include two DS units of the associated DS unit storage set when the DS unit loading indicator for the two DS units is below a loading threshold and the estimated DS unit performance compares favorably to the performance goal (e.g., the rebuilding execution is estimated to be completed within a desired timeframe).

The method continues at step 156 where the processing module determines rebuilding resource assignments. Such rebuilding resource assignments match the rebuilding tasks (e.g., which slice names). Such a determination may be based on one or more of which pillar and DS unit is associated with the error slices, the rebuilding resources, a performance goal, a security goal, the candidate rebuilding resources, estimated DS unit performance, DS unit availability, a DS unit capacity indicator, a DS unit loading indicator, a loading threshold, a DS unit proximity to the DS unit storage set indicator, the DS unit storage set, a system unit and/or system module availability indicator, a query, a list, a predetermination, a message, and a command. For example, the processing module determines the rebuilding resource assignments to include a first set of error slices to DS unit 1 and a second set of error slices to DS unit 2 of the associated DS unit storage set when DS unit 1 is associated with the first set of error slices and DS unit 2 is associated with the second set of error slices. The method continues at step 158 where the processing module sends the rebuilding resource assignments to the rebuilding resources to execute the assigned rebuilding.

In another example of operation, the processing module retrieves slices associated with other pillars of the error slices a DSN memory, re-creates the data object in accordance with the operational parameters, determines a different set of operational parameters (e.g., a more reliable information dispersal algorithm), produces slices for each pillar of the data object in accordance with the different set of operational parameters, stores the slices of each pillar in the DSN memory, updates the virtual DSN address to physical location table, and deletes the remaining slices associated with the error slices and the original operational parameters of the data object from the DSN memory.

Figure 9:
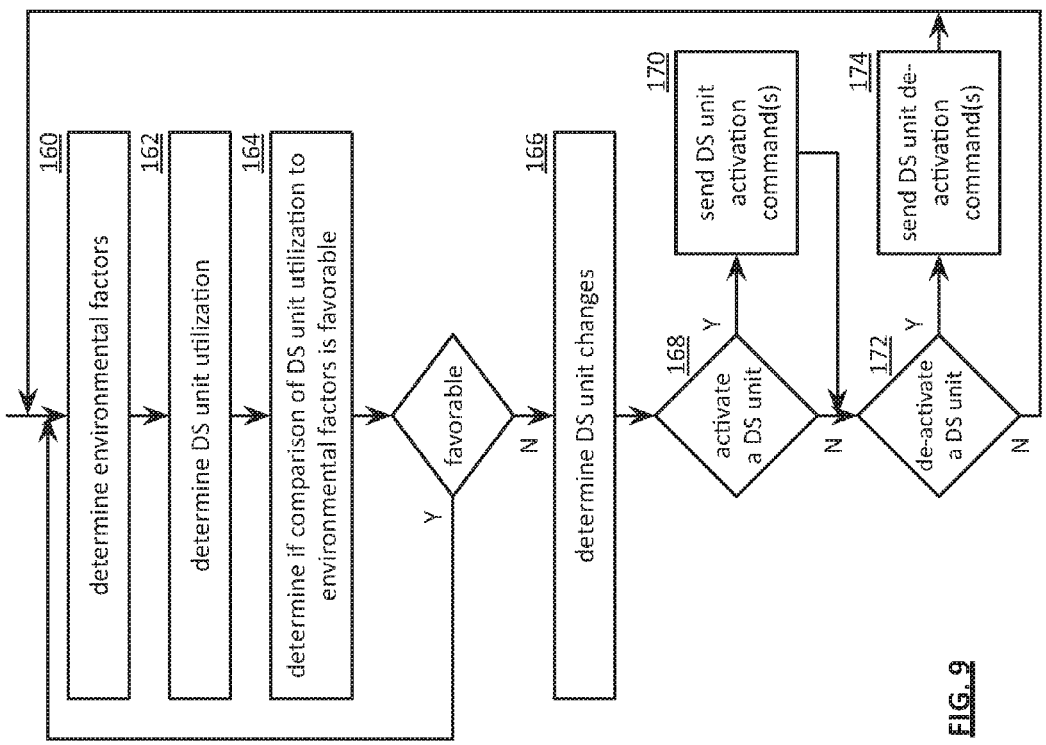
FIG. 9 is a flowchart illustrating an example of managing power consumption in accordance with the invention.

FIG. 9 is a flowchart illustrating an example of managing power consumption. The method begins with step 160 where processing module (e.g., of a dispersed storage (DS) unit) determines environmental factors where the environment factors may include one or more of power costs per site, power usage per site, power usage per DS unit, power usage per memory per DS unit, and power availability. Such a determination may be based on one or more of a smart grid message, a query of DS units, a DS managing unit message, a remote monitor, a centralized monitor, a schedule, a predetermination, a message, and a command. For example, the processing module may determine the environmental factors to include a higher power cost at site 8 relative to sites 1-7 based on a smart grid message (e.g., a message from an electricity provider).

The method continues at step 162 where the processing module determines DS unit utilization where the DS unit utilization may include one or more of frequency of access information (e.g., store, retrieve, status, delete), power utilization information, location information, and/or operational parameters of one or more vaults and DS unit storage sets. Such a determination may be based on one or more of a smart grid message, a query of DS units, a DS managing unit message, a remote monitor, a centralized monitor, a schedule, a predetermination, a message, and a command. For example, the processing module determines the DS unit utilization at sites 1-8 to be substantially the same based on a query of the DS units.

The method continues at step 164 where the processing module determines if a comparison of DS unit utilization to the environmental factors is favorable. A favorable comparison may indicate that a favorable amount of power is being utilized by the DS units and/or a favorable number (e.g., a read threshold and/or a write threshold) of DS units of a DS unit storage set are available. Such a determination may be based on one or more of the environmental factors, the DS unit utilization, an energy policy (e.g., maximum power usage, maximum power usage while providing just a read and/or write threshold of active DS units, maximum cost, maximum cost while providing just a read and/or write threshold of active DS units), a DS unit power threshold, a smart grid message, and energy usage threshold, and a DS unit storage set configuration. For example, the processing module determines that the comparison of the DS unit utilization to the environmental factors is not favorable when the power utilization for a DS unit storage set is above the DS unit power threshold. For instance, the power utilization may be too high due to the higher power costs at site 8. In another example, the processing module determines that the comparison of the DS unit utilization to environmental factors is not favorable when a read threshold number of DS units of a DS unit storage set are unavailable due to previous DS unit deactivation to save power. The method branches back to step 160 when the processing module determines that a comparison of the DS unit utilization to the environmental factors is favorable. The method continues to step 166 when the processing module determines that a comparison of the DS unit utilization to the environmental factors is not favorable.

The method continues at step 166 where the processing module determines DS unit changes where the changes may result in a favorable comparison of the DS unit utilization to the environmental factors. For example, the processing module may determine DS unit changes that result in DS unit deactivation where the frequency of usage is low or not required and the power cost is higher relative to other sites. In another example, the processing module may determine DS unit changes where the frequency of usage is high and the cost of power is low.

The method continues at step 168 where the processing module determines whether to activate a DS unit based on the DS unit changes. The method branches to step 172 when the processing module determines to not activate a DS unit. The method continues to step 170 when the processing module determines to activate a DS unit. The method continues at step 170 where the processing module sends a DS unit activation command to DS units to activate. The method branches to step 172.

The method continues at step 172 where the processing module determines whether to deactivate a DS unit based on the DS unit changes. The method repeats back to step 160 when the processing module determines to not deactivate a DS unit. The method continues to step 174 when the processing module determines to deactivate a DS unit. The method continues at step 174 where the processing module sends a DS unit deactivation command to the DS units to deactivate. The method repeats back to step 160. Note that the processing module may activate one or more DS units substantially simultaneously and/or the processing module may deactivate one or more DS units substantially simultaneously.

Figure 10:
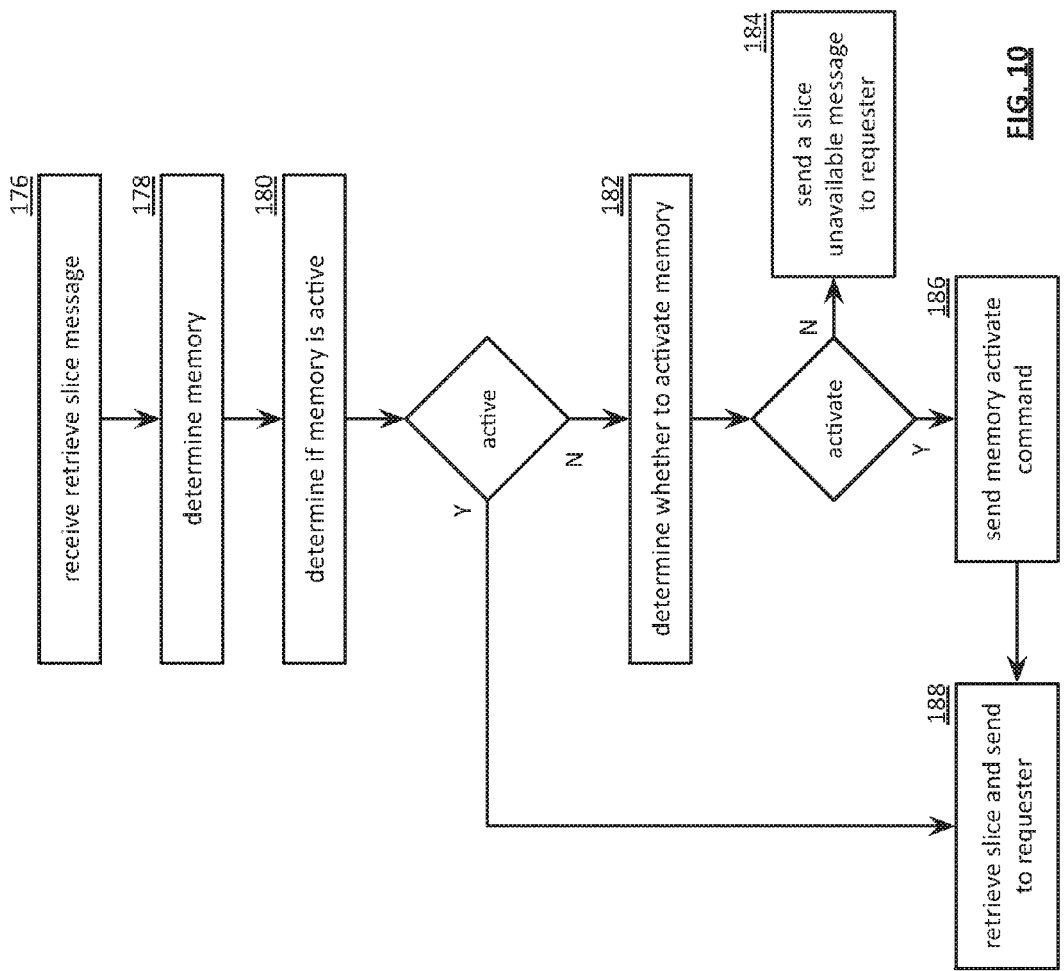
FIG. 10 is a flowchart illustrating an example of retrieving data in accordance with the invention.

FIG. 10 is a flowchart illustrating an example of retrieving data. The method begins with step 176 where a processing module (e.g., of a dispersed storage (DS) unit) receives a retrieve slice message from a requester (e.g., one of a DS processing unit, a user device, a storage integrity processing unit, a DS managing unit, and a DS unit). Such a retrieve slice message may include one or more of a requester ID, a retrieval command, slice names, a source name, a data object name, a data type, a priority indicator, a security indicator, a performance indicator, a priority override indicator, and an energy policy.

The method continues at step 178 where the processing module determines memory where the memory may be within a present DS unit and/or other DS units. Such memory corresponds to where the desired encoded data slices are stored. Such a determination may be based on one or more of slice names, a local virtual DSN address to physical location table lookup, a list, a command, and information contained within the retrieve slice message.

The method continues at step 180 where the processing module determines if the memory is active (e.g., powered on and available). Such a determination may be based on one or more of the memory, a query, an estimated future availability indicator, a local virtual DSN address to physical location table lookup, a list, a command, a message, and/or other information contained in the retrieve slice message. For example, the processing module determines that the memory is active based on a query of the memory. The method branches to step 188 when the processing module determines that the memory is active. The method continues to step 182 when the processing module determines that the memory is not active.

The method continues at step 182 where the processing module determines whether to activate the memory. Such a determination may be based on one or more of the estimated future availability indicator, an availability time threshold, a requester ID, slice names, a source name, a data object name, a data type, a priority indicator, a security indicator, a performance indicator, an energy policy, an energy usage history, an energy usage threshold, and a priority override indicator. In an example, the processing module determines to activate the memory when the priority override indicator indicates to activate the memory. In another example, the processing module determines to wait until the memory activates itself even when the priority override indicator indicates to activate the memory when the estimated future availability indicator is below the availability time threshold.

The method branches to step 186 when the processing module determines to activate the memory. The method continues to step 184 when the processing module determines to not activate the memory. At step 184, the processing module sends a slice unavailable message to the requester. In an instance, the requester may send another message in response that may include a priority override indicator. In another instance, the requester may simply rely on retrieving slices from other pillars to reconstruct the data object.

The method continues at step 186 where the processing module sends a memory activate command to one or more memories and/or one or more DS units to activate the memory to facilitate access. At step 188, the processing module retrieves encoded data slices and sends the slices to the requester. In addition, the processing module may deactivate the memory after retrieving the slice when the memory was not active.

Figure 11:
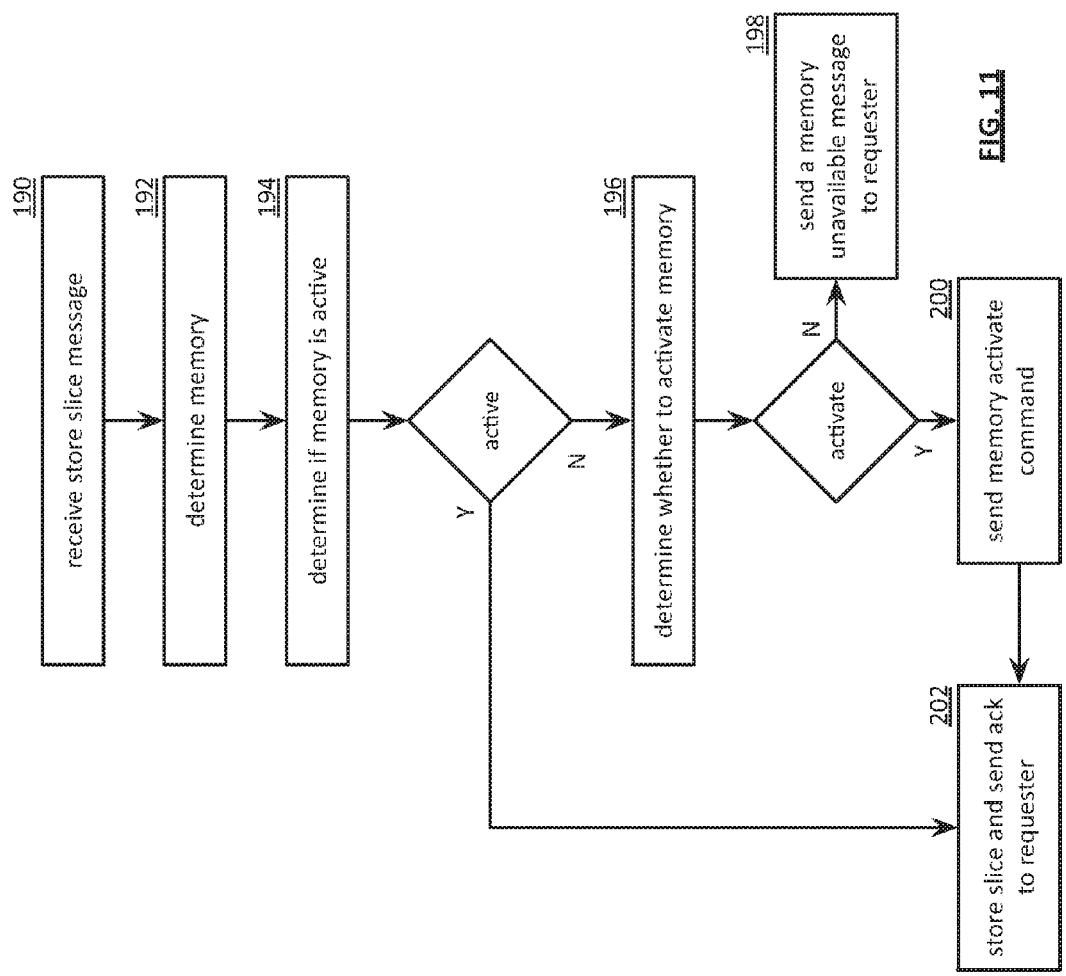
FIG. 11 is a flowchart illustrating an example of storing data in accordance with the invention.

FIG. 11 is a flowchart illustrating an example of storing data. The method begins with step 190 where a processing module (e.g., of a dispersed storage (DS) unit) receives a store slice message from one of a DS processing unit, a user device, a storage integrity processing unit, a DS managing unit, and a DS unit. Such a store slice message may include one or more of a requester ID, a store command, slice names, EC data slices, a source name, a data object name, a data type, a priority indicator, a security indicator, a performance indicator, a priority override indicator, and an energy policy.

The method continues at step 192 where the processing module determines memory where the memory may be within a present DS unit and/or other DS units. Such memory corresponds to where encoded data slices are desired to be stored. Such a determination may be based on one or more of slice names, a local virtual DSN address to physical location table lookup, a list, a command, and information contained within the store slice message.

The method continues at step 194 where the processing module determines if the memory is active (e.g., powered on and available). Such a determination may be based on one or more of the memory, a query, an estimated future availability indicator, a local virtual DSN address to physical location table lookup, a list, a command, a message, and other information contained in the store slice message. For example, the processing module determines that the memory is active based on a query of the memory. The method branches to step 202 when the processing module determines that the memory is active. The method continues to step 196 when the processing module determines that the memory is not active.

The method continues at step 196 where the processing module determines whether to activate the memory based on one or more of an estimated future availability indicator, an availability time threshold, a requester ID, the slice names, the source name, the data object name, the EC data slices, the data type, a priority indicator, a security indicator, a performance indicator, an energy policy, an energy usage history, an energy usage threshold, and a priority override indicator. In an example, the processing module determines to activate the memory when the priority override indicator indicates to activate the memory. In another example, the processing module determines to temporarily cache the slice and wait until the memory activates itself even when the priority override indicator indicates to activate the memory when the estimated future availability indicator is below the availability time threshold. In another example, the processing module determines to temporarily cache the slice and wait until the memory activates itself when the processing module receives a message that indicates that a write threshold number pillars has/will be stored in other memories and/or DS units.

The method branches to step 200 when the processing module determines to activate the memory. The method continues to step 198 when the processing module determines to not activate the memory. At step 198, the processing module sends a memory unavailable message to a requester. In an instance, the requester may send another message in response that may include a priority override indicator. In another instance, the requester may simply rely on storing slices to a write threshold number of other pillars.

The method continues at step 200 where the processing module sends a memory activate command to one or more memories and/or one or more DS units to activate the memory to facilitate access. At step 202, the processing module stores encoded data slices in the memory and sends the acknowledgement to the requester. Alternatively, the processing module may deactivate the memory after storing the slice when the memory was not active.

Figure 12:
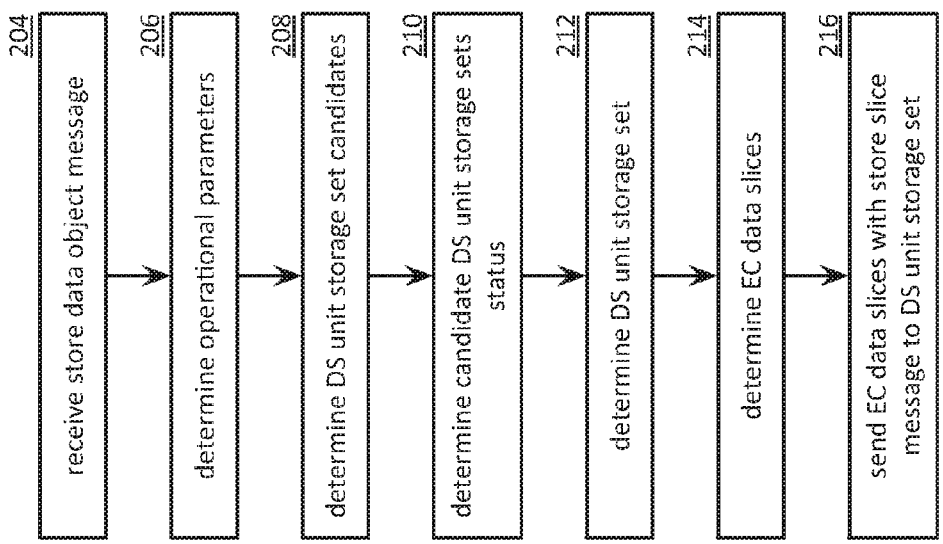
FIG. 12 is another flowchart illustrating another example of storing data in accordance with the invention.

FIG. 12 is another flowchart illustrating another example of storing data. The method begins at step 204 or at processing module receives a store data object message from one of a user device, the dispersed storage (DS) processing unit, a storage integrity processing unit, a DS managing unit, or a DS unit. Such a store data object message may include one or more of a requester ID, a store command, a data object name, a data object, a data type, a priority indicator, a security indicator, a performance indicator, and an energy policy.

The method continues at step 206 where the processing module determines operational parameters. Such a determination may be based on one or more of a requester ID, a vault lookup, a store command, a data object name, a data object, a data type, a priority indicator, a security indicator, a performance indicator, a command, a predetermination, and an energy policy. The method continues at step 208 where the processing module determines DS unit storage set candidates (e.g., there may be more than one available and/or pre-assigned to the vault). Such a determination may be based on one or more of a query, the operational parameters, an availability indicator, a requester ID, a vault lookup, a store command, a data object name, a data object, a data type, a priority indicator, a security indicator, a performance indicator, a command, a predetermination, and an energy policy.

The method continues at step 210 where the processing module determines candidate DS unit storage set status (e.g., available, unavailable, active, inactive). Such a determination may be based on one or more of the candidate DS unit storage set, a query, the operational parameters, a status indicator, an availability indicator, a requester ID, a vault lookup, a store command, a data object name, a data object, a data type, a priority indicator, a security indicator, a performance indicator, a command, a predetermination, and an energy policy.

The method continues at step 212 where the processing module determines a DS unit storage set (e.g., which DS unit storage set to utilize). Such a determination may be based on one or more of the candidate DS unit storage sets, the candidate DS unit storage sets status, a query, the operational parameters, a status indicator, an availability indicator, a requester ID, a vault lookup, a store command, a data object name, a data object, a data type, a priority indicator, a security indicator, a performance indicator, a command, a predetermination, and an energy policy. For example, the processing module determines the DS unit storage set that comprises at least a write threshold of active DS units. In another example, the processing module determines the DS unit storage set that comprises the most active number of DS units even when that number is less than the write threshold. In an instance, the processing module may include a priority override in the message to the DS unit storage set.

The method continues at step 214 where the processing module dispersed storage error encodes the data object in accordance with the operational parameters to produce encoded data slices. The method continues at step 216 where the processing module sends the encoded data slices with a store slice message to the DS unit storage set for storage therein. In an example, the processing module may include a priority override in the store slice message when the priority indicator is above a threshold and the energy policy indicates that priority overrides are allowed. In another example, the processing module may include a command to keep the DS unit active for a minimum timeframe in the store slice message when the DS unit is inactive.

In addition, the method may branch back to step 206 to find a different set of operational parameters that may successfully result in finding an available DS unit storage set when the processing module is unable to determine an available DS unit storage set. For example, the processing module may determine operational parameters to include a pillar width of 16 in a first pass of the method and may determine operational parameters to include a pillar width of 8 in a second pass of the method when the first pass of the method fails to determine an available DS unit storage set with a pillar width is 16.

Figure 13:
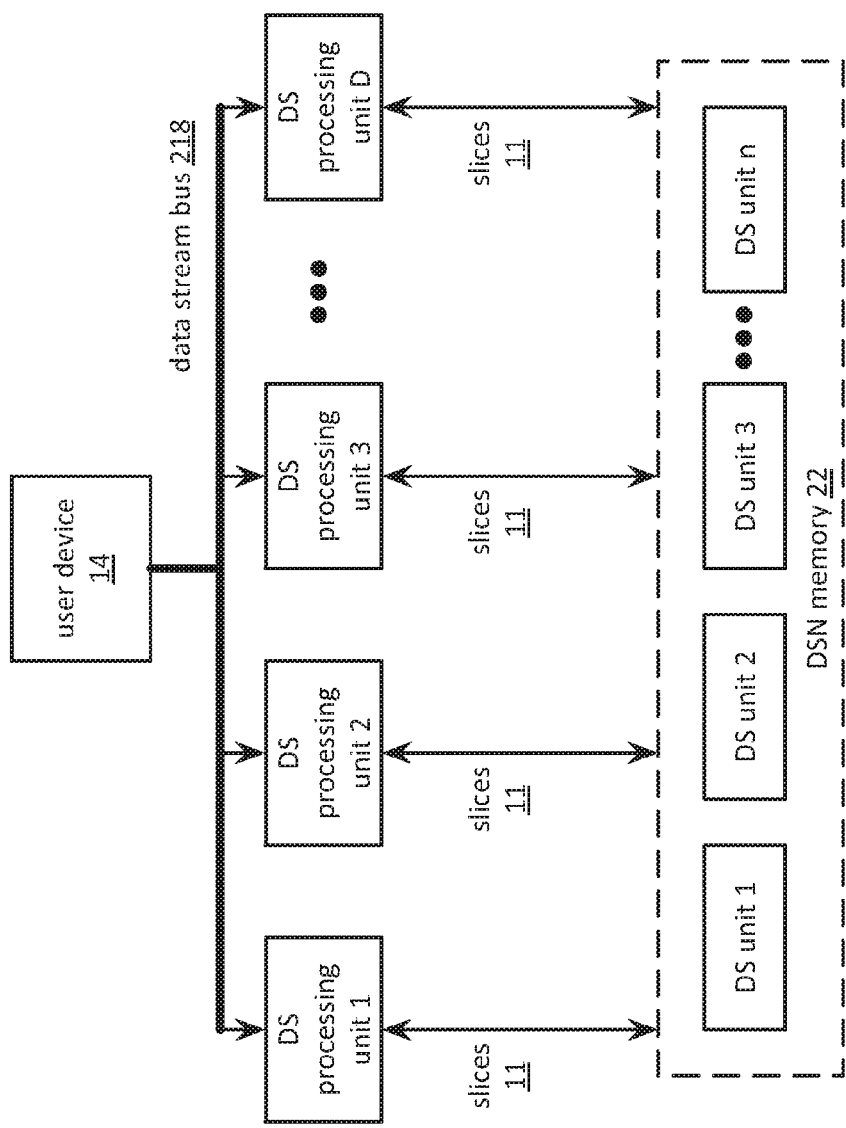
FIG. 13 is another schematic block diagram of another embodiment of a computing system in accordance with the invention.

FIG. 13 is another schematic block diagram of another embodiment of a computing system where the computing system captures and stores a data stream and/or data object to facilitate subsequent reliable retrieval. As illustrated, the system includes a user device 14, a plurality of dispersed storage (DS) processing units 1-D, a data stream bus 218, and a dispersed storage network (DSN) memory 22. The user device 14 sends the data stream and/or data object to two or more of the DS processing units to store the data stream and/or a data object as a reliable set of encoded data slices 11 in the DSN memory 22. The reliable set of encoded data slices 11 includes a primary set of encoded data slices and at least one temporary replicated set of encoded data slices. In an example, the temporary replicated set of encoded data slices is deleted when the primary set of encoded data slices is verified to be correct.

The user device 14 communicates in part with the plurality of DS processing units via a data stream bus 218. The data stream bus 218 facilitates simultaneous communications of a data stream and/or data object from the user device to two or more DS processing units. For example, the user device 14 may send a live video stream to two or more of the DS processing units for storage in the DSN memory 22. In an example, the plurality of DS processing units may be located at a common site. In another example, a plurality of DS processing units may be located at different sites. The DS processing units may communicate with each other via the data stream bus 218 and/or a network 24.

The DSN memory 22 comprises a plurality of DS units 1-n to store slices produced by the plurality of DS processing units 1-D. In an example, the plurality of D S processing units utilizes substantially the same DS units of the DSN memory 22 where each of the DS processing units utilizes similar operational parameters. In another example, the plurality of DS processing units utilizes different DS units of the DSN memory 22 where at least two of the DS processing units utilize different operational parameters.

In an example of operation, each DS processing unit creates encoded data slices from the data stream received from the data stream bus 218 in accordance with a common set of operational parameters. Note that the encoded data slices created by two or more of the DS processing units may be substantially the same. Each DS processing unit may send the encoded data slices 11 that it creates to the DSN memory 22 for storage. In an example, the DS processing unit sends the slices 11 from each pillar to the DSN memory 22 for storage. In another example, the DS processing unit sends slices 11 from less than all of the pillars to the DSN memory 22 for storage. For example, DS processing unit 1 sends the pillar 1 slices to the DSN memory 22, DS processing unit 2 sends the pillar 2 slices to the DSN memory 22, DS processing unit 3 sends the pillar 3 slices to the DSN memory 22, etc. In another example, DS processing unit 1 sends the pillar 1 and pillar 2 slices to the DSN memory 22, DS processing unit 2 sends the pillar 2 and pillar 3 slices to the DSN memory 22, DS processing unit 3 sends the pillar 3 and pillar 4 slices to the DSN memory 22, etc.

In another example of operation, each DS processing unit sends all the pillar slices 11 to the DSN memory 22 for storage when the DS processing units create segments from the data stream where the segments are not identical (e.g., at least two DS processing units choose a different starting point for each segment within the same incoming data stream). In such an example, the DS processing units may send all the pillar slices 11 to the DSN memory 22 for storage when the DS processing units are unsynchronized.

In another example of operation, each of the DS processing units may send fewer than all of the pillar slices 11 to the DSN memory 22 for storage when the DS processing units create segments from the data stream of the segments are substantially identical (e.g., all of the DS processing units choose the same starting point for each segment within the incoming data stream). In such an example, the DS processing units may send fewer than all of the pillar slices 11 to the DSN memory 22 for storage when the DS processing units are synchronized.

Note that while the DS processing units receive the same data over the data stream bus 218, it is possible that system errors (e.g., input errors due to overruns, slow processing, missed bits, slice creation errors) will result in slight differences between the encoded data slices 11 produced by two or more of the DS processing units. In such an example, some of the encoded data slices 11 may be correct slices while other encoded data slices 11 may be incorrect slices. Further note that the re-creation of the data stream based on incorrect slices may produce undesirable slightly different (e.g., as compared to the original) reproduced data streams. For example, DS processing unit 2 may create incorrect slices due to an input error and all the other DS processing units may create correct slices for a given section of the data stream when DS processing units 1-D each create and send slices of all the pillars to the DSN memory 22 for storage.

A DS processing of one of the DS processing units, the user device, the storage integrity processing unit, the DS managing unit, and/or the DS unit may execute a compression method from time to time to delete incorrect slices from the DSN memory 22 and/or to delete one or more replicated sets of correct slices. For example, DS processing unit 3 may execute a compression method to delete incorrect slices generated by DS processing unit 2 and to delete replicated correct slices generated by DS processing units 3-D (e.g., leaving the correct slices in the DSN memory that were produced by DS processing unit one). Note that the compression method may provide a memory utilization improvement to the computing system.

The DS processing may execute the compression method by retrieving slice sets (e.g., sets generated by one or more of the DS processing units) from the DSN memory 22, determine incorrect slices and replicated correct slices based in part on comparing the sets, and sending delete slice messages to the DSN memory 22 to delete the incorrect slices and at least some of the replicated correct slices. Such a determination of incorrect slices may be based on identifying slices that are different than substantially all the other slices that correspond to the same portion of the data stream. Such a determination of correct slices may be based in part on identifying slices that are substantially the same as substantially all the other slices that corresponds to the same portion of the data stream. Such a determination of replicated correct slices may be based in part on the correct slices and a selection algorithm to select non-replicated correct slices that are to remain stored in the DSN memory. The method of operation of the compression method is discussed in greater detail with reference to FIG. 14.

In an alternative example of operation, each DS processing unit creates encoded data slices 11 from the data stream received from the data stream bus 218 in accordance with two or more sets of operational parameters. For example, DS processing unit 1 may utilize operational parameters with a pillar width of 16, DS processing unit 2 may utilize operational parameters with a pillar width of 32, and DS processing unit 3 may utilize operational parameters for the pillar width of 8. In such an example, the compression method may determine incorrect slices based on retrieving the three sets of slices, re-creating three copies of the same portion of the data stream in accordance with the three different sets of operational parameters, and comparing the three copies of the same portion of the data stream to identify the incorrect slices that are substantially different from the correct slices. Note that the same approach may be utilized by the DS processing to execute the compression method when the DS processing units are unsynchronized.

FIG. 14 is another flowchart illustrating another example of storing data. The method begins with step 220 where a processing model determines data to de-replicate where the data to de-replicate may include a portion of a previously stored data stream. Such a determination may be based on one or more of a data stream identifier (ID), where a process left off last time, an amount of data left to de-replicate, an error message, a memory utilization indicator, a dispersed storage network (DSN) memory status indicator, a dispersed storage (DS) managing unit message, a command, a message, and a predetermination.

The method continues at step 222 where the processing module determines DS units and retrieve encoded data slices from the DS units. Such a determination may be based on one or more of the data to de-replicate, a virtual DSN address to physical location table lookup, operational parameters lookup, a data stream ID, an error message, a DSN memory status indicator, a DS managing unit message, a command, a message, and a predetermination. The method continues at step 224 where the processing module determines a synchronization type based on one or more of a vault lookup, operational parameters, the encoded data slices, the data to de-replicate, a virtual DSN address to physical location table lookup, a data stream ID, an error message, a DSN memory status indicator, a DS managing unit message, a command, a message, and a predetermination. Such synchronization type may include synchronized or not synchronized. The synchronized type synchronization may indicate that the slices for the same pillar are likely substantially identical for the same data segments when there are no slice errors. The not synchronized type synchronization may indicate that the slices for the same pillar are likely substantially not identical for the same data segments even when there are no slice errors since the corresponding data segments may have started at slightly different boundaries. The not synchronized type synchronization may indicate that similar portions of the data object re-created from aggregated data segments of retrieved slices are likely substantially identical when there are no slice errors. The method branches to step 232 when the processing module determines the synchronization type to be not synchronized. The method continues to step 226 when the processing module determines the synchronization type to be synchronized.

The method continues at step 226 where the processing module compares encoded data slices of the same pillar and same data segment. Note that the encoded data slices should be substantially identical for the same pillar of the same data segment when the same operational parameters were utilized by a plurality of DS processing units to create the slices. The method continues at step 228 where the processing module determines error-free correct encoded data slices based on the comparison of the encoded data slices of the same pillars in the same data segment where the encoded data slices are substantially the same as the others of the comparison. In an example, correct encoded data slices are identified as those that are bit by bit equivalent to each other. In another example, correct encoded data slices are identified as those that are bit by bit equivalent to a bit by bit value of the majority of the other slices.

The method continues at step 230 where the processing module determines redundant and/or replicated correct slices based on one or more of the determined correct encoded data slices, a replicated correct encoded data slice selection algorithm, a vault lookup, the operational parameters, the encoded data slices, the data to de-replicate, a virtual DSN address to physical location table lookup, a data stream ID, an error message, a DSN memory status indicator, a DS managing unit message, a command, a message, and a predetermination. For example, the replicated correct encoded data slice selection algorithm may favor determining replicated correct encoded data slices as slices stored in DS units where the DSN memory status indicator indicates that the DS units storage capacity utilization is above a threshold. In such an example, the processing module may identify replicated correct encoded data slices of the DS units where the deletion of replicated decoded to slices may provide a system improvement. In another example, the replicated correct encoded data slice selection algorithm may favor determining replicated correct encoded data slices as slices stored in DS units outside of a favored DS unit storing non-replicated correct slices. In such an example, the processing module may choose to keep a copy of the correct encoded data slices on a given DS unit and delete the replicated correct encoded data slices from all the other DS units.

The method of step 230 continues where the processing module determines missing and/or error slices (e.g., incorrect slices) based on one or more of the determined correct slices, the determined replicated correct slices, an error slice selection algorithm, a replicated correct slice selection algorithm, a comparison of the slices of the same pillars in the same data segment where the slices are substantially not the same as the others of the comparison, a vault lookup, the operational parameters, the slices, the data to de-replicate, a virtual DSN address to physical location table lookup, a data stream ID, an error message, a DSN memory status indicator, a DS managing unit message, a command, a message, and a predetermination. In an example, the processing module determines the incorrect encoded data slices as those that are bit by bit substantially not equivalent to a bit by bit value of the majority of the other encoded data slices. In another example, the processing module determines the incorrect encoded data slices as the remaining encoded data slices that are not part of the determined correct encoded in slices.

The method of step 230 continues where the processing module sends delete slice messages to the DS units for the redundant encoded data slices, the missing encoded data slices, and the error encoded data slices to delete the slices and lists of the slices from the DS units of the DSN memory. Note that the above process repeats for all the data segments of the portion of data that is being de-replicated. Further note that the entire process repeats for the next portion of data when the present portion of data has been de-replicated.

The method continues at step 232 where the processing module re-creates replicated data object section copies when the process module determines the synchronization type to be not synchronized. The processing module re-creates the replicated data object sections by retrieving slices for as many copies that were stored in the DSN memory and re-creating the data object section copies in accordance with the operational parameters.

The method continues at step 234 with a processing module compares the replicated data object section copies section by section. Note that the processing module may shift back and forth what should be a similar section of multiple copies to provide a time alignment of the comparison. In an example, the processing module determines an error-free copy section when a bit by bit comparison of a given copy is substantially the same as a bit by bit value of at least one other copy of the same section. In another example, the processing module determines an error-free copy section when a bit by bit comparison of a given copy is substantially the same as a bit by bit value of the majority of the other copies.

The method continues at step 236 where the processing module determines redundant and/or replicated data object section copies based on one or more of the determined error-free copy sections, a replicated error-free copy section selection algorithm, a vault lookup, the operational parameters, the slices, the data to de-replicate, a virtual DSN address to physical location table lookup, a data stream ID, an error message, a DSN memory status indicator, a DS managing unit message, a command, a message, and a predetermination. For example, the replicated error-free copy section selection algorithm may favor determining replicated copy sections as slices stored in DS units where the DSN memory status indicator indicates that the DS units storage capacity utilization is above a threshold. In such an example, the processing module may identify replicated correct slices on the DS units where the deletion of replicated slices may provide a system improvement. In another example, the replicated error-free copy section selection algorithm may favor determining replicated copy sections as sections stored in DS units outside of a favored DS unit storing non-replicated correct sections. In such an example, the processing module may choose to keep a copy of the correct slices on a given DS unit and delete the replicated correct slices from all the other DS units.

The method of step 236 continues where the processing module determines missing and/or error copy sections (e.g., incorrect slices) based on one or more of the determined correct copy sections, the determined replicated correct copy sections, an error copy section selection algorithm, a replicated correct copy section selection algorithm, a comparison of the sections of the same pillars in the same data segment where the sections are substantially not the same as the others of the comparison, a vault lookup, the operational parameters, the slices, the data to de-replicate, a virtual DSN address to physical location table lookup, a data stream ID, an error message, a DSN memory status indicator, a DS managing unit message, a command, a message, and a predetermination. In an example, the processing module determines the incorrect copy sections as those that are bit by bit substantially not equivalent to a bit by bit value of the majority of the other copy sections. In another example, the processing module determines incorrect slices as the remaining copy sections that are not part of the determined correct copy sections.

The method continues at step 238 where the processing module sends delete slice messages to the DS units corresponding to the redundant copy sections, the missing copy sections, and the error copy sections to delete the slices and lists of the slices from the DS units of the DSN memory. Note that the above process repeats for all the data segments of the portion of data that is being de-replicated. Further note that the entire process repeats for the next portion of data when the present portion of data has been de-replicated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:

storing a plurality of encoded data slices in a memory device of a first storage unit of a set of storage units of a dispersed storage network (DSN), wherein each encoded data slice of the plurality of encoded data slices is a dispersed storage error encoded portion of a respective segment of a data object;

determining that the stored plurality of encoded data slices require rebuilding;

determining, by the first storage unit, to rebuild the stored plurality of encoded data slices in a distributed manner;

identifying at least two additional storage units of the set of storage units having rebuilding resources;

allocating rebuilding assignments among the at least two additional storage units for generating a rebuilt plurality of encoded data slices corresponding to the stored plurality of encoded data slices, including assigning a rebuilding assignment of the rebuilding assignments to one of the at least two additional storage units based on a pillar number of an encoded data slice of the stored plurality of encoded data slices;
sending the rebuilding assignments to the at least two additional storage units;
receiving, in response to the rebuilding assignments, the rebuilt plurality of encoded data slices; and
storing the rebuilt plurality of encoded data slices in the first storage unit.

2. The method of claim 1, wherein the determining that the stored plurality of encoded data slices require rebuilding is based on at least one of:
receiving a message from a storage integrity processor of the DSN; or
detecting a failure or reliability issue regarding the memory device of the first storage unit.

3. The method of claim 1, wherein the determining to rebuild the stored plurality of encoded data slices includes determining that a number of encoded data slice errors meets a rebuilding error threshold value.

4. The method of claim 1, wherein the determining to rebuild the stored plurality of encoded data slices in a distributed manner is based, at least in part, on an estimate of the load to rebuild the stored plurality of encoded data slices by the first storage unit.

5. The method of claim 1, wherein the determining to rebuild the stored plurality of encoded data slices in a distributed manner is based on one or more of:
a number of encoded data slices that require rebuilding, a storage unit loading indicator, a storage unit capacity indicator, a rebuilding error threshold, an error list, a number of errors, a comparison of the number of errors to the rebuilding error threshold, a command, a message, a local storage unit query, or a storage unit query.

6. The method of claim 1, wherein identifying at least two additional storage units of the set of storage units having rebuilding resources includes:
identifying candidate rebuilding resources of the at least two additional storage units of the set of storage units; and
selecting two or more rebuilding resources from the candidate rebuilding resources based on one or more of:
a storage unit availability, a storage unit capacity indicator, a storage unit loading indicator, a storage unit proximity to the first storage unit, a storage unit storage set affiliation, a system module availability indicator, a query, a list, a predetermination, a message, or a command.

7. The method of claim 1, wherein allocating rebuilding assignments further includes one or more of:
assigning the rebuilding assignment of the rebuilding assignments to one of the at least two additional storage units based on performance capabilities of the one of the at least two additional storage units; or
assigning the rebuilding assignment of the rebuilding assignments to one of the at least two additional storage units based on the one of the at least two additional storage units being collocated in a site with the first storage unit.

8. The method of claim 1, wherein generating the rebuilt plurality of encoded data slices comprises:
requesting, by a rebuilding resource of one of the at least two additional storage units, a decode threshold number of encoded data slices of a set of encoded data slices associated with an encoded data slice of the stored plurality of encoded data slices;
receiving the decode threshold number of encoded data slices;
decoding the decode threshold number of encoded data slices to recover a data segment;
dispersed storage error encoding the recovered data segment to produce a set of rebuilt encoded data slices;
selecting a rebuilt encoded data slice of the set of rebuilt encoded data slices as a rebuilt version of the encoded data slice of the stored plurality of encoded data slices; and
sending the rebuilt encoded data slice to the first storage unit for storage therein.

9. The method of claim 1, wherein storing the rebuilt plurality of encoded data slices in the first storage unit includes:
storing, by the first storage unit, the rebuilt plurality of encoded data slices in a new memory device or another memory device of the first storage unit.

10. A non-transitory computer readable memory comprises:
a first memory section that stores operational instructions that, when executed by a processing unit of a dispersed storage network (DSN), causes the processing unit to detect a failed memory device of a plurality of memory devices of a first storage unit of a set of storage units of the DSN, wherein:
each storage unit of the set of storage units includes a plurality of memory devices and a processing module;
the processing module includes a rebuilding resource;
a data object is divided into a plurality of data segments;
a data segment of the plurality of data segments is dispersed storage error encoded into a set of encoded data slices;
the first storage unit stores first encoded data slices of a plurality of sets of encoded data slices corresponding to the data object; and
the first storage unit stores the first encoded data slices in the failed memory device;
a second memory section that stores operational instructions that, when executed by the processing unit, causes the processing unit to determine to rebuild the first encoded data slices distributedly or locally with respect to the first storage unit;
a third memory section that stores operational instructions that, when executed by the processing unit, causes the processing unit to:
when determined to rebuild the first encoded data slices distributedly:
identify two or more rebuilding resources from the rebuilding resources of the set of storage units; and
allocate rebuilding assignments among the identified rebuilding resources for generating a rebuilt plurality of encoded data slices corresponding to the first encoded data slices, including assigning a rebuilding assignment of the rebuilding assignments to one of the identified rebuilding resources based on a pillar number of an encoded data slice of the first encoded data slices; and
a fourth memory section that stores operational instructions that, when executed by the identified rebuilding resources, causes the identified rebuilding resources to rebuild the first encoded data slices.

11. The non-transitory computer readable memory of claim 10 further comprises:
the second memory section further stores operational instructions that, when executed by the processing unit, causes the processing unit to determine to rebuild the first encoded data slices locally; and
a fifth memory section that stores operational instructions that, when executed by the processing unit, causes the first storage unit to:
request a decode threshold number of encoded data slices of a set of encoded data slices of the plurality of sets of encoded data slices associated with an encoded data slice of the first encoded data slices;
receive the decode threshold number of encoded data slices;
decode the decode threshold number of encoded data slices to produce a recovered data segment;
dispersed storage error encode the recovered data segment to produce a set of rebuilt encoded data slices;
select a rebuilt encoded data slice of the set of rebuilt encoded data slices as a rebuilt version of the encoded data slice of the first encoded data slices; and
store the rebuilt encoded data slice in a memory device of the first storage unit other than the failed memory device.

12. The non-transitory computer readable memory of claim 10, wherein the second memory section further stores operational instructions that, when executed by the processing unit, causes the processing unit to determine to rebuild the first encoded data slices distributedly or locally further by:
determining to rebuild distributedly when an estimate of the load to rebuild the first encoded data slices by the rebuilding resource of the first storage unit is above a threshold; and
determining to rebuild locally when the estimate of the load to rebuild is at or below the threshold.

13. The non-transitory computer readable memory of claim 10, wherein the second memory section further stores operational instructions that, when executed by the processing unit, causes the processing unit to determine to rebuild the first encoded data slices distributedly or locally based on one or more of:
a number of encoded data slices that require rebuilding, a storage unit capacity indicator, a rebuilding error threshold, an error list, a number of errors, a comparison of the number of errors to the rebuilding error threshold, or a storage unit query.

14. The non-transitory computer readable memory of claim 10, wherein the third memory section stores operational instructions that, when executed by the processing unit, causes the processing unit to identify the two or more rebuilding resources by:
identifying candidate rebuilding resources of the rebuilding resources of the set of storage units; and
selecting the two or more rebuilding resources from the candidate rebuilding resources based on one or more of:
a storage unit availability, a storage unit capacity indicator, a storage unit loading indicator, a storage unit proximity to a storage set indicator, a storage unit storage set, a query, a list, a predetermination, or a message.

15. The non-transitory computer readable memory of claim 10, wherein the third memory section stores operational instructions that, when executed by the processing unit, causes the processing unit to allocate rebuilding assignments by one or more of:
assigning the rebuilding assignment of the rebuilding assignments to one of the identified rebuilding resources based on performance capabilities of the one of the identified rebuilding resources; or
assigning the rebuilding assignment of the rebuilding assignments to one of the identified rebuilding resources based on the one of the identified rebuilding resources being collocated in a site with the first storage unit.

16. The non-transitory computer readable memory of claim 10, wherein the fourth memory section further stores operational instructions that, when executed by one of the identified rebuilding resources, causes the one of the identified rebuilding resources to rebuild an encoded data slice of the first encoded data slices by:
requesting a decode threshold number of encoded data slices of a set of encoded data slices of the plurality of sets of encoded data slices regarding an encoded data slice of the first encoded data slices;
receiving the decode threshold number of encoded data slices;
decoding the decode threshold number of encoded data slices to recover a data segment;
dispersed storage error encoding the recovered data segment to produce a set of rebuilt encoded data slices;
selecting a rebuilt encoded data slice of the set of rebuilt encoded data slices as a rebuilt version of the encoded data slice of the first encoded data slices; and
sending the rebuilt encoded data slice to the first storage unit for storage therein.

17. The non-transitory computer readable memory of claim 10 further comprises:
a fifth memory section that stores operational instructions that, when executed by the processing unit, causes the processing unit to store rebuilt encoded data slices corresponding to the first encoded data slices in a memory device of the first storage unit other than the failed memory device.

18. The non-transitory computer readable memory of claim 10, wherein the first memory section further stores operational instructions that, when executed by the processing unit, causes the processing unit to detect the failed memory device of the first storage unit based one or more of:
determining that a calculated slice checksum for at least one encoded data slice of the first encoded data slices does not match a stored slice checksum;
a message from the first storage unit; or
a query of the set of storage units when at least one storage unit of the set of storage units reports that there is at least one encoded data slice error.

19. The non-transitory computer readable memory of claim 10, wherein the first memory section further stores operational instructions that, when executed by the processing unit, causes the processing unit to determine slice names for the first encoded data slices.

20. The non-transitory computer readable memory of claim 10, wherein the processing unit is a storage integrity processing unit.

* * * * *